F. H. SWANSON.
MAP CASE.
APPLICATION FILED OCT. 21, 1916.
1,234,415.
Patented July 24, 1917.
3 SHEETS—SHEET 1.
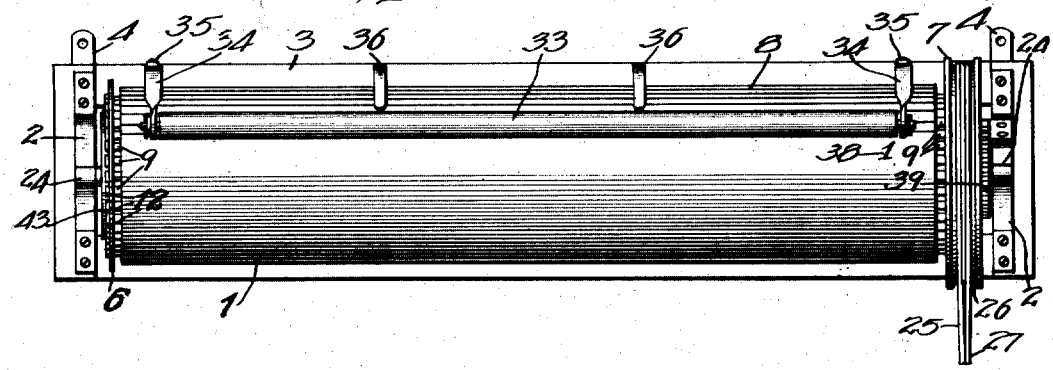
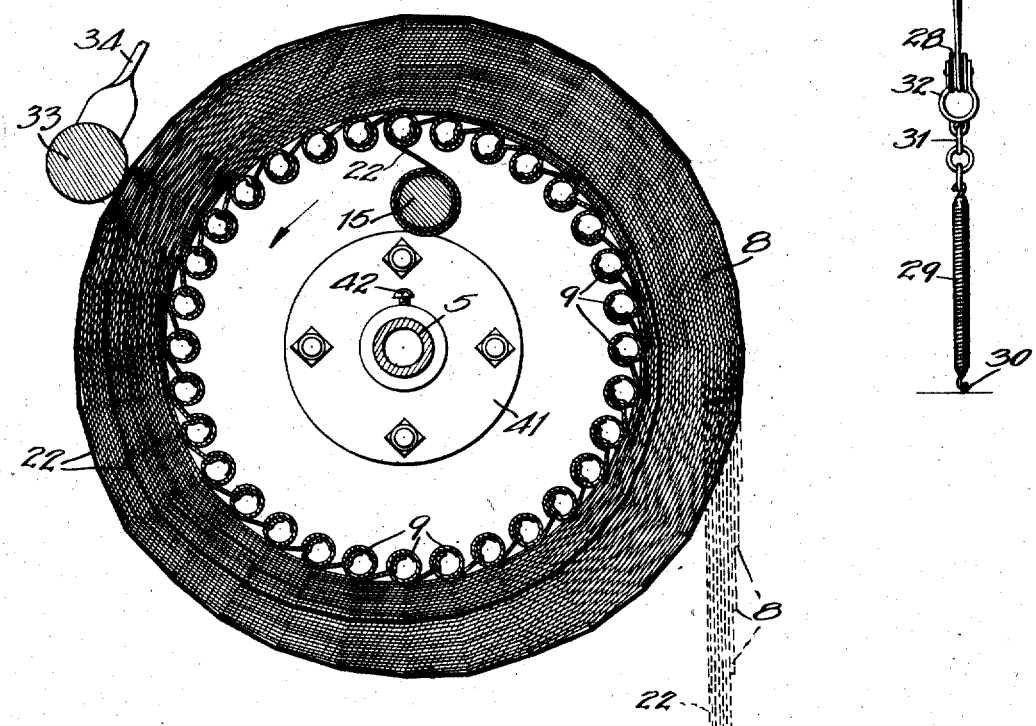
Witnesses,
W. T. Kilroy
Harry R. L. White
Inventor:
Frank H. Swanson
By Edward Jay Wilson
Atty.

F. H. SWANSON.
MAP CASE.
APPLICATION FILED OCT. 21, 1916.
1,234,415.
Patented July 24, 1917.
3 SHEETS—SHEET 2.
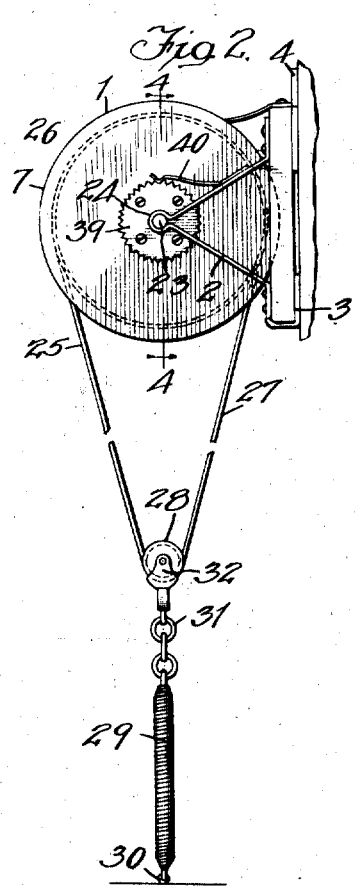
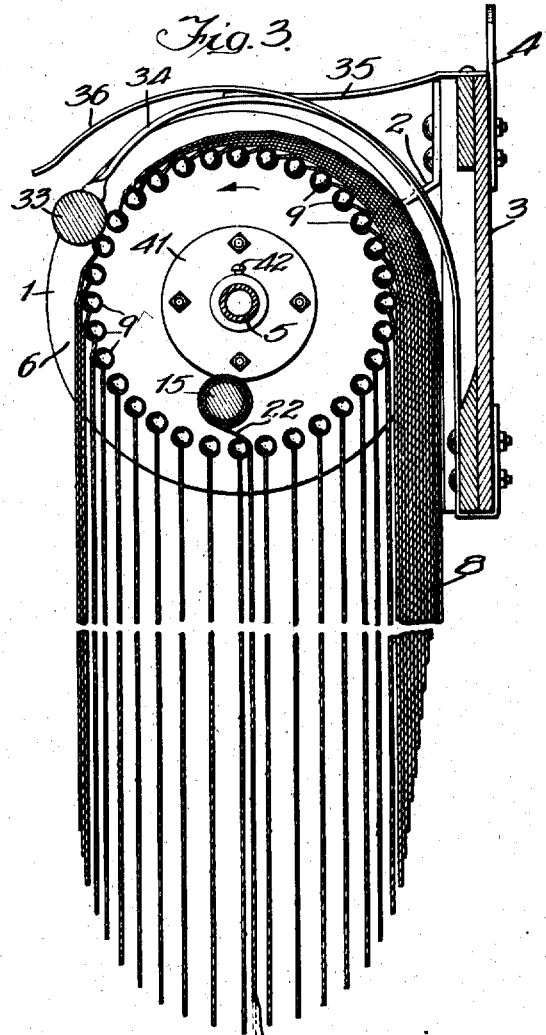
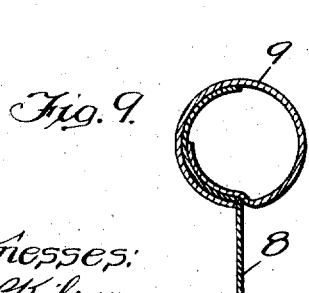
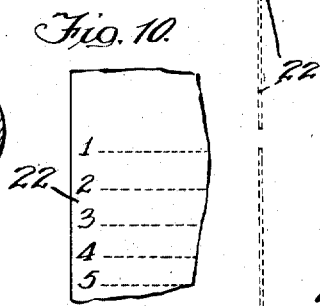
Witnesses:
W. F. Kilroy
Harry R. L. White
Inventor:
Frank H. Swanson
By Edward Jay Wilson
Atty.

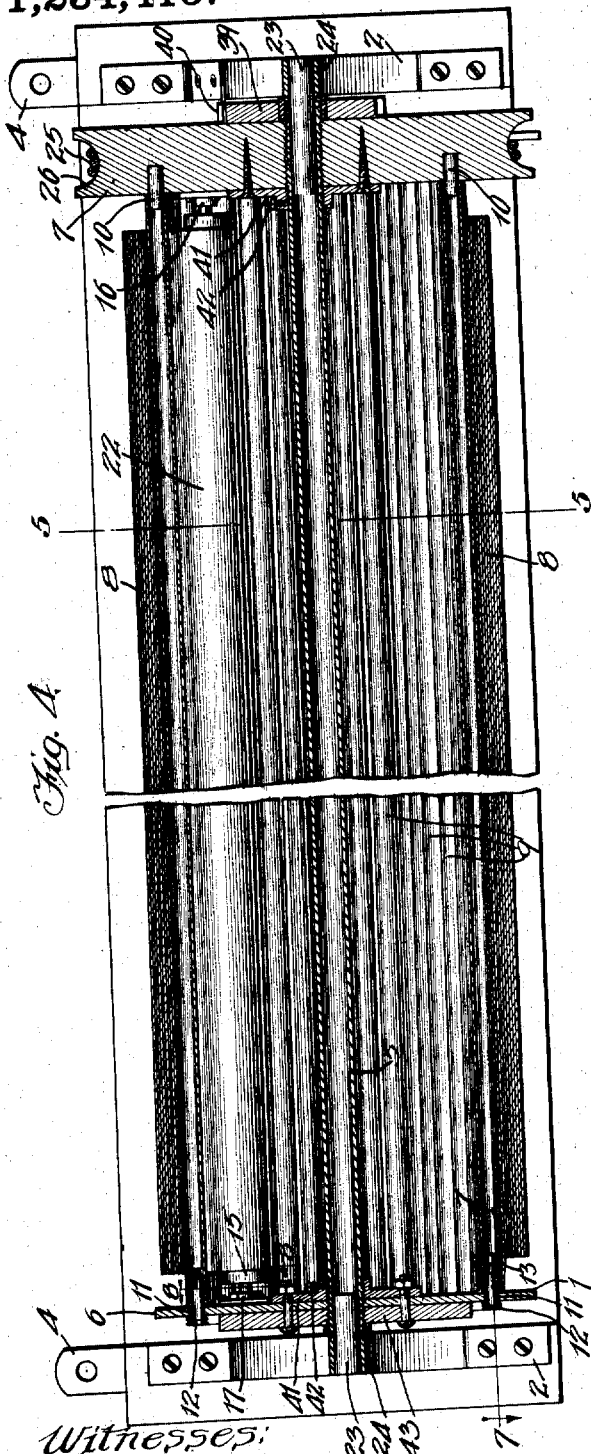

UNITED STATES PATENT OFFICE.

FRANK H. SWANSON, OF CHICAGO, ILLINOIS, ASSIGNOR TO A. J. NYSTROM & CO., OF CHICAGO, ILLINOIS, A CORPORATION OF ILLINOIS.

MAP-CASE.

1,234,415.     Specification of Letters Patent.     Patented July 24, 1917.

Application filed October 21, 1916. Serial No. 126,987.

*To all whom it may concern:*

Be it known that I, FRANK H. SWANSON, a citizen of the United States, and a resident of Chicago, county of Cook, and State of Illinois, have invented a certain new, useful, and Improved Map-Case, of which the following is a specification.

My invention relates to map exhibition devices and has special reference to an improved wall map case.

The object of my invention is to provide a wall map case, of compact form; wherein the maps shall be wound on a drum of relatively large diameter; whereby any one of the series of maps can be readily selected for exhibition; and wherein the maps when not in use shall be covered, and maintained practically dust proof.

A further object of my invention is to provide a map mounting, by means of which a series of maps can be readily controlled and individual maps selected for exhibition and which mounting shall also lend itself to the easy removal of individual maps for use independently of the map case as a whole.

A further object of my invention is to provide a wrapping or cover for the maps so arranged or mounted in the case that it can be either withdrawn for covering the maps or retracted within the body of the case at times when the maps are being exhibited.

My invention consists in a wall map case of drum form, the drum being formed of the individual bars to which the maps are attached, these bars being readily removable, and a cover fabric, mounted upon a spring operated roller within the drum, which cover is adapted to be withdrawn or extended from the case when it is desired to cover the maps and to be retracted into the drum when it is desired to exhibit the maps.

My invention also consists in a wall map case of the character described having a series of maps adapted to be wound in overlapped relation upon the drum, a pressure roller adapted to control the dropping of the ends of the maps and designations on the backs of the maps adapted to be brought into view in serial order for the purpose of aiding the selection of the map sought.

My invention also consists in a map case of the kind described one side of the extension cover being provided with an index of the maps carried by the case and referring to said maps by the designations which appear upon the backs of the maps.

My invention also consists in the several arrangements and combinations of devices and parts and in the features of construction by which I am enabled to attain the above mentioned and other objects and all as hereinafter described and particularly pointed out in the appended claims.

My invention will be more readily understood by reference to the accompanying drawings forming part of this specification and in which:

Figure 1, is a front elevation of a wall map case made in accordance with my invention, shown as it would appear when hanging on a wall in operative but closed condition;

Fig. 2, is an end elevation of same;

Fig. 3, is a vertical section of the map case taken between the ends thereof, showing the drum and maps in position to permit the adjustment of the cover;

Fig. 4, is a vertical longitudinal central section on the line 4—4 of Fig. 2;

Fig. 5, is an enlarged vertical cross-section of the drum on line 5—5 of Fig. 4, showing the maps wound upon the drum and the cover in position protecting them;

Fig. 6, is a fragmentary perspective view of one of the individual maps as it appears when removed from the case for independent use;

Fig. 7, is a fragmentary longitudinal section on the line 7—7 of Fig. 4;

Fig. 8, is a detail fragmentary section on the line 8—8 of Fig. 4, particularly illustrating the method of mounting the spring roller, to which the cover is attached;

Fig. 9, is an enlarged sectional view on the line 9—9 of Fig. 6, showing the method of securing the tubular supporting bars to the upper edges of the maps; and Fig. 10, is a fragmentary front elevation of a portion of the cover diagrammatically showing the index thereon.

In school and other educational work it frequently occurs that it is desirable to associate a series of wall maps for serial exhibition. As I am informed this has heretofore been best accomplished by mounting each individual map on a spring roller of its own and arranging the several rollers in drum form for the purpose of easily bringing the desired map to the front.

By means of my improved mounting or wall case I eliminate the cumbrous spring rollers with their constant liability to get out of order, and I am enabled to mount a much larger number of maps within a given space, and furthermore by means of the cover, which is mounted on a roller within the drum formed by the supports of the individual maps, I have provided a very convenient and effective dust proof cover for the maps which can be easily, quickly and effectively applied when the maps are not in use.

My improved wall map case comprises a built up drum 1, mounted at its ends for rotation upon its axis, in brackets 2. The brackets 2 are preferably secured in position upon a base frame 3, which is provided adjacent to its ends with perforated hangers 4, for securing the case upon the wall.

The drum 1 comprises preferably a central horizontal shaft 5, which I preferably make of a pipe to eliminate weight, upon one end of which shaft 5 I rigidly mount a thin disk 6 and upon the other end I rigidly mount a relatively thick disk 7 and I groove its periphery so that it serves as a pulley for rotating the drum. These two disks serve to carry the maps 8. I provide each map 8 with a tubular rigid bar or rod 9 at its upper edge. Preferably the rod 9 is formed by rolling up a sheet of metal into tubular form the longitudinal edges of which overlap each other, as best shown in Fig. 9, and I clamp the upper edge of the map between these overlapped edges, the resiliency of the metal serving to hold the edge of the map tightly in position.

For holding the maps in position between the two disks 6 and 7 I provide the disk 7 with an annular row of fixed pins 10 adapted to enter the adjacent ends of the map rods 9 as best shown in Fig. 4 and I provide the disk 6 with a corresponding annular row of holes 11, the several holes 11 being in longitudinal alinement with the several pins 10 and adapted to receive yielding rod retainers 12. The retainers 12, as best shown in Fig. 7, are provided with tapered inner ends 13 adapted to project within the rods 9 and with enlarged heads 14 adapted to contact with the outer surface of the plate 6 and thus properly position the retainers 12. Each of the map rods 9 is thus held in position between the disks 6 and 7, one end thereof upon one of the pins 10 and the other end thereof upon one of the retainers 12. Thus mounted each rod 9 can rotate slightly to yield to the strain upon the map which is supported by the rod as the drum is rotated in one direction or the other. Within the series of rods 9 is mounted at one point a spring roller 15 one end of which is carried in a bearing socket 16 upon the disk 7 and the other end of which is carried in a bracket 17 suitably secured upon the disk 6. The bracket 17 as best shown in Fig. 8, is provided with a rectangular slot 18 in which the flattened end 19 of the roller support is received and it is retained in the slot 18 by means of a shoulder 20 on the bracket 17 and for an additional security I provide a spring cotter 21 which effectually closes the mouth of the slot 18 and prevents the escape of the roller support 19 even though the tension should happen to be all relieved from the spring of the spring roller 15. On this spring roller I mount a strip of fabric 22 which is considerably longer than the maps and is adapted to be wound up upon the roller 15 when it is desired to exhibit the maps and to be withdrawn from the roller 15 to a position where its free end extends beyond the ends of the maps a sufficient distance so that when the maps are wound up upon the drum the free end of the strip 22 will cover all of the free ends of the maps as best shown in Fig. 5.

For mounting the drum so that it can rotate I preferably drive plugs 23 into the two ends of the hollow shaft 5 to form trunnions at the ends of the drum. These trunnions are received in the outer ends 24 of the brackets 2.

For controlling the rotation of the drum I wind a cord or rope 25 in the peripheral groove 26 in the disk 7.

This cord as shown in the drawings has several turns around the edge of the disk one of the turns forming an elongated loop 27 and in the lower end of this loop I mount a guide sheave 28, and I hold the sheave down, preferably by a long tension spring 29, the lower end of the spring being formed to engage a screw eye 30 secured to floor or the wall in alinement with the disk 7, and the upper end of the spring being hooked to a link 31 which is secured to the bracket 32 in which the sheave 28 is held for rotation. I provide several of the links 31 forming a short chain between the upper end of the spring and the sheave bracket so that as the rope 25 stretches, the spring can be changed from one link to another and thus maintain the rope under proper tension. The spring and sheave hold the rope 25 taut and in proper operating position so that when it is desired to rotate the drum in either direction this is accomplished by pulling down on either the forward or the rear part of the loop 27.

For the purpose of retaining the drum in certain specific positions and for assisting in selecting a certain map for exhibit purposes and for controlling the winding of the maps properly upon the drum I provide a long pressure roll 33 carried upon relatively stiff spring brackets 34 which are secured at their opposite ends to the frame 3 and extend around the upper part of the drum substantially parallel to the outer surface thereof and spaced therefrom. The roller 33 is rotatably mounted at the free ends of the brackets 34 as best shown in Fig. 1, and the brackets themselves serve as guides for the free ends of the maps as the drum is rotated.

For the purpose of adding to the stiffness of the brackets 34 without greatly adding to the weight of the device I provide braces 35 secured at their rear ends to the upper edge of the base 3 and extended forwardly therefrom and their forward ends secured rigidly to the brackets 34 rearwardly from the roller 33. I provide additional curved spring guides 36 spaced between the brackets 34 and assisting to control the ends of the maps as the drum is rotated.

In Fig. 3, I have shown the maps and the drum in the positions they occupy when the drum is placed so that the cover 22 can be freely drawn out from or rolled upon the spring roller 15, that is at such times the spring roller is at the lower side of the drum as shown.

In Fig. 10, I have shown a fragmentary view of a portion of the cover 22 showing a series of numbers forming an index, each number would be followed by a description of one of the maps of the series, the numbers being equal to the number of maps. In the form of case illustrated this is 32. This index is visible when the cover 22 is extended below the maps, as shown in dotted lines in Fig. 3 for the purpose of aiding in selection of the proper map. Having determined which map it is desired to exhibit by an inspection of this index the cover is wound up upon the spring roller 15, which is an ordinary shade roller, until the extending portion of the cover is shorter than the adjacent maps, as shown in full lines in Fig. 3. Then the drum is rotated in the direction of the arrow on Fig. 3 winding up all of the maps upon the drum similar to the manner in which they are wound as illustrated in Fig. 5 but without the cover being wound upon the outer ends of the maps. As shown in Fig. 6, which shows the front face of a map, I provide the front face of each map with a designation mark 37 on the right hand upper corner being the same designation mark as shown on the index on the cover 22, and on the rear face of each map as shown in dotted lines in Fig. 6, I provide a similar designation mark 38 which is the same as the designation mark 37 on the front face of the map. As the drum is rotated in the direction of the arrow on Fig. 3 the rear faces of the several maps will be presented to view one after the other immediately below the pressure roller 33 and, as indicated in dotted lines on Fig. 5, immediately the end of the map passes the roller 33 the map drops to a vertically hanging position at the rear of the drum. Consequently as the designation marks 38 which are on the backs of the maps continue to appear below the pressure roller 33 the map which it is desired to be exhibited can be dropped into vertical position as described and the motion of the drum then stopped. When this has occurred the drum can be rotated in the opposite direction sufficiently to bring the selected map to the forward side of the drum for exhibition as shown in Fig. 3 the map which is being exhibited, being the map attached to the bar which is directly below and in contact with the pressure roller 33.

Usually the holding power of the pressure roller 33 is sufficient to maintain the drum with the exhibited map in the position shown, but some times the friction of the operating rope 25 is so slight that the drum rotates automatically in the direction opposite to the arrow on Fig. 3 until the weight of the maps is equally distributed, such rotation would carry the upper end of the exhibited map above and behind the pressure roller 33. To prevent this undesired action I secure a toothed wheel 39 centrally upon the outer face of the disk 7 and I provide a spring dog 40 secured to the adjacent bracket 2 and having its free end arranged to engage in the notches between the teeth on the wheel 39 and thus yieldingly retain the drum against rotation. The teeth of the wheel 39 and the engaging end of the spring dog 40 are formed to permit a forced rotation of the drum in either direction.

For the purpose of securing the disks 6 and 7 upon the hollow shaft 5 I preferably thread the outer surface of the ends of the shaft 5 and I provide internally threaded flanges 41 which I screw tightly upon the ends of the shaft securing them with set screws 42 and I secure the disks 6 and 7 to these flanges by bolts or screws as shown. For the purpose of reinforcing the disk 6 and thus make it rigid in position I provide an extra reinforcing disk 43 also threaded to fit the shaft and screwed solidly against the outer surface of disk 6 before the same is bolted to the adjacent flange 41.

It is important of course that when the disks have been secured to the shaft they remain in perfect alinement as otherwise the map supports would not be retained in their proper positions.

Before the maps 8 are mounted in the tubes 9 the outer edges of their upper ends are reinforced by small pieces of fabric 44 to prevent the adjacent edges of the tubing cutting or tearing the maps.

To remove a single map from the map case the desired map is placed in the position of the forward or exhibited map as shown in Fig. 3 and then the spring retainer 12 is removed and the map rod can then be withdrawn from the pin 10 and removed from the case. As shown in Fig. 6 each map is provided with an opening 45 at its middle portion just below the map rod 9 which opening is reinforced by an eyelet 46 and after the map has been removed from the case it can be hung upon a suitable support, as a nail, by means of the eyelet 46 or, if such is desired, the extending ends of the rod 9 can be rested upon suitable spaced supports. It will thus be clear that the maps, as mounted, are capable of conjoint use in the drum with the other maps of the series or capable of being easily and quickly removed from the map case and used independently of the case and the other maps. This latter feature is an important one in many schools where it is desired, for purposes of instruction to use a limited number of the maps in a room different from that in which the map case is hung and without the necessity of taking down and rehanging the map case as a whole.

When it is desired to roll the maps upon the drum and cover them, as shown in Fig. 5, the maps and case being in the exhibition position as shown in Fig. 3, the cover 22 is first fully drawn out as shown in dotted lines in Fig. 3 and then the drum is rotated by means of the rope 25 in the direction of the arrow on Fig. 3 until the maps are all wound upon the drum and it is further rotated until the cover 22 is wound upon the outer or free ends of the maps as shown in Fig. 5. During such operation of winding, the pressure roller 33 automatically operates to hold the maps tightly rolled in overlapped relation and at such time the cover takes its spiral position as best shown by the heavy black line on Fig. 5.

For the purpose of presenting a map for exhibition, the maps and casing being in the covered relation shown in Fig. 5, the drum is first rotated forwardly in the direction of the arrow in Fig. 5 until the free end of the cover is released from the spring roller 33 and drops to vertical position, when such has occurred the drum is rotated sufficiently in the opposite direction to bring the spring roller 15 to the bottom of the drum as shown in Fig. 3 then the cover is retracted upon the spring roller 15 and the procedure for the selection of a specific map is in accordance with the directions hereinbefore given.

As many modifications of my invention will readily suggest themselves to one skilled in the art, I do not limit or confine my invention to the specific structures herein shown and described.

I claim:

1. In an exhibition device a rotatable drum, a series of exhibition sheets each attached at one end to the cylindrical surface of the drum and adapted to be wound in overlapped relation thereon, a cover sheet carried by the drum, arranged between two adjacent exhibition sheets and capable of extension and retraction for the purposes specified.

2. In a map case formed of a drum composed in part of a series of rod-like map supports upon which as a whole the maps are adapted to be wound, a spring roller mounted within the drum and carrying a cover for the maps, said cover being capable of being withdrawn into the drum to bring its free end within the limits of the adjacent maps, and to be drawn out a sufficient distance so that when the maps are wound on the drum the cover will inclose or hide the free ends of the maps, and pressure means adapted to retain the cover in contact with the maps when the maps and cover are wound on the drum in overlapped relation.

3. In a map case a rotatable drum, a series of maps adapted to be wound in overlapped relation thereon, the cylindrical part of the drum being formed of bars to which the attached ends of the individual maps are secured; in combination with a cover carried on a roller mounted within the drum, said cover extending out between two adjacent map bars and capable of extension and retraction.

4. In a wall map case a rotatable drum, a series of maps adapted to be wound in overlapped relation thereon, the cylindrical part of the drum being formed of the bars to which the attached ends of the individual maps are secured, in combination with a cover carried on a roller mounted within the drum, said cover extending out between two adjacent map bars and capable of extension and retraction, and a pressure roller adapted to contact with the backs of the maps as they are wound upon the drum and retain the cover wound tightly upon the overlapping maps when the drum is rotated to wind the maps thereon.

5. In a map case a rotatable drum, a series of maps spaced circumferentially around the drum and having one end of each attached thereto and said maps adapted, as the drum is rotated, to be wound in overlapped relation upon the drum, and a cover mounted upon the drum parallel with the maps adapted to be drawn out from the drum sufficiently so that when the maps are wound in overlapped relation upon the drum the cover is adapted to cover or hide the free ends of the maps said cover being also adapted to be retracted sufficiently so that its free end is shorter than the adjacent maps.

6. In a map case a rotatable drum, a series of maps spaced circumferentially around the drum and having one end of each attached thereto and said maps adapted, as the drum is rotated, to be wound in overlapped relation upon the drum, means controlling the dropping of the free ends of the maps for exhibiting same, and a map cover carried on a roller on the drum arranged parallel with the maps, said cover being longer than the maps and adapted to be drawn out a sufficient distance, so that when the maps and cover are wound upon the drum in overlapped relation the cover will hide or protect the free ends of the maps, said cover being also adapted to be retracted sufficiently so that its free end will not interfere with the proper dropping of the free ends of the maps.

7. In a map case a rotatable drum, a series of maps spaced circumferentially around the drum and attached thereto so that when the drum is rotated in one direction the maps shall be wound in overlapped relation thereon, a pressure roll adapted to bear upon the drum and retain the maps in compactly wound condition, a designation character on the back of each map adjacent to its free end, a cover mounted upon a roller carried by the drum and adapted to be drawn out a sufficient distance so that when the drum is rotated to wind the maps thereon the cover will be wound upon the maps and cover and protect same, a serial index on one side of said cover adapted to be exposed to view when the said cover is drawn out, said cover being adapted to be retracted sufficiently so that its free end does not interfere with the operation of the device for exhibiting the maps, the map designation characters upon said index and upon the backs of the maps corresponding with each other.

8. In a wall map case two relatively fixed rotatable disks, one thereof provided with an annular series of fixed pins the other thereof provided with a similar annular series of holes, a series of maps each having a tubular upper bar equal in length to the distance between said disks and adapted to be mounted at one end upon one of said fixed pins and at other end upon a removable pin projected through the corresponding hole in the other disk.

9. In a wall map case two relatively fixed rotatable disks, one thereof provided with an annular series of fixed pins the other thereof provided with a similar annular series of holes, a series of maps each having a tubular upper bar equal in length to the distance between said disks and adapted to be mounted at one end upon one of said fixed pins and at the other end upon a removable pin projected through the corresponding hole in the other disk, and means for retaining the removable pins in place.

10. In a wall map case two relatively fixed rotatable disks one thereof provided with an annular series of fixed pins the other thereof provided with a similar annular series of holes, a series of maps each having a tubular upper bar equal in length to the distance between said disks and adapted to be mounted at one end upon one of said fixed pins and at the other end, upon a removable pin projecting through the corresponding hole in the other disk, and means for causing the removable pins to engage in the tubes with sufficient friction to prevent their accidental withdrawal.

11. In an exhibition device two relatively fixed rotatable disks in combination with a series of exhibition sheets each having a rigid bar attached to its upper end, means for mounting said bars in an annular series on one of said disks, the other disk being provided with an annular series of holes, removable pins adapted to be projected through said holes and engage said bars, as and for the purpose specified.

In testimony whereof, I have hereunto set my hand this 13th day of October 1916, in the presence of one subscribing witness.

FRANK H. SWANSON.

Witness:
EDWARD FAY WILSON.

Copies of this patent may be obtained for five cents each, by addressing the "Commissioner of Patents, Washington, D. C."